(12) United States Patent
Ismail

(10) Patent No.: US 9,605,995 B2
(45) Date of Patent: Mar. 28, 2017

(54) WOBBLE DETECTION VIA SOFTWARE DEFINED PHASE-LOCK LOOPS

(71) Applicant: Apple Inc., Cupertino, CA (US)

(72) Inventor: James S. Ismail, San Jose, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 14/472,274

(22) Filed: Aug. 28, 2014

(65) Prior Publication Data

US 2015/0128711 A1   May 14, 2015

Related U.S. Application Data

(60) Provisional application No. 61/902,061, filed on Nov. 8, 2013.

(51) Int. Cl.
*G01H 1/00* (2006.01)
*G01P 15/00* (2006.01)

(52) U.S. Cl.
CPC ............... *G01H 1/00* (2013.01); *G01P 15/00* (2013.01)

(58) Field of Classification Search
CPC .................................. G01H 1/00; G01P 15/00
USPC ........................................................... 73/652
See application file for complete search history.

(56) References Cited

U.S. PATENT DOCUMENTS

| 3,033,043 A * | 5/1962 | Runft | G01P 15/097 310/333 |
|---|---|---|---|
| 3,151,487 A * | 10/1964 | Schuck | G01P 15/08 310/329 |
| 3,879,676 A | 4/1975 | Schulz et al. | |
| 4,173,749 A * | 11/1979 | Corkhill | G01V 1/04 323/217 |
| 2007/0153949 A1 | 7/2007 | Chen et al. | |
| 2010/0253437 A1 | 10/2010 | Seeger et al. | |
| 2012/0042727 A1* | 2/2012 | Egedal | F03D 17/00 73/504.03 |
| 2012/0075970 A1* | 3/2012 | Iizuka | G11B 7/0053 369/44.13 |

FOREIGN PATENT DOCUMENTS

| CN | 1992528 | 7/2007 |
|---|---|---|
| CN | 201673169 | 12/2010 |
| CN | 102981522 | 3/2013 |

(Continued)

OTHER PUBLICATIONS

Chinese Patent Application No. ZL201420799779.3 [Utility Model Patentability Evaluation Report (UMPER) dated Apr. 20, 2015].

*Primary Examiner* — J M Saint Surin
(74) *Attorney, Agent, or Firm* — Downey Brand LLP

(57) ABSTRACT

The embodiments relate to the use of one or more phase lock loops (PLL's) for detecting wobble of a surface upon which a computing device is set. The PLL's can be configured to lock onto an exponentially-damped sinusoid output from an accelerometer in order to differentiate between surface-induced movement and direct human-induced movement of the computing device. Reduced latency in wobble detection can be achieved by implementing the PLL in software and using multiple PLL's per accelerometer axis. Further reduction in the latency of wobble detection can be achieved by seeding the phase of an oscillator signal generated by each PLL in order to improve phase estimates when attempting to lock a PLL onto the accelerometer output.

19 Claims, 12 Drawing Sheets

(56) References Cited

FOREIGN PATENT DOCUMENTS

| | | |
|---|---|---|
| CN | 203014748 | 6/2013 |
| CN | 103368563 | 10/2013 |
| JP | H10185787 | 7/1998 |

* cited by examiner

WOBBLE DETECTION VIA SOFTWARE DEFINED PHASE-LOCK LOOPS

CROSS-REFERENCE TO RELATED APPLICATIONS

The present application claims the benefit of U.S. Provisional Application No. 61/902,061, entitled "WOBBLE DETECTION VIA SOFTWARE DEFINED PHASE-LOCK LOOPS" filed Nov. 8, 2013, the content of which is incorporated herein by reference in its entirety for all purposes.

FIELD

The described embodiments relate generally to detecting a wobble motion of a system, and more particularly to detecting a wobble motion of a system using software defined phase-lock loops with reduced latency.

BACKGROUND

A system, such as a computing device, can be subject to various vibrations from movements by a user or naturally occurring oscillations on a surface on which the computing device rests. Measurements of vibrations are sometimes used by certain computing devices in order to provide feedback to a user who is operating the computing device. However, in some instances, the types of vibrations that are occurring need to be determined in order to provide accurate measurements for and responses to the vibrations. Because different motions and vibrations result in varying wave forms, algorithms for determining vibrations types can be slow when implemented by a processor. Any latency in measurements can result in a delayed reaction time for the computing device, degrading the quality of the user experience when the user is expecting certain feedback from vibrations at the computing device. Additionally, processes that depend on the feedback will be delayed, resulting in multiple latent or inaccurate responses to the user's input.

SUMMARY

This paper describes various embodiments that relate to detecting wobble or vibrations occurring at a computing device, and differentiating between human-induced vibrations and natural vibrations occurring at a surface abutting the computing device. In some embodiments, a method for detecting a vibration using one or more phase lock loops of a software-implemented control system is set forth. The method can include determining an accelerometer signal is sinusoidal when a frequency of a digital oscillator signal generated by the one or more phase lock loops substantially matches a frequency of a digitized accelerometer signal generated based on the accelerometer signal.

In other embodiments, a machine-readable non-transitory storage medium is set forth. The machine-readable non-transitory storage medium can store instructions that, when executed by a processor included in a computing device, cause the computing device to carry out steps that include providing a lock signal to the computing device. The lock signal can be provided when a frequency of a digitized accelerometer signal is substantially equal to a digitized oscillator signal output from a voltage-controlled oscillator. The voltage-controlled oscillator can be configured to iteratively estimate the frequency of the digitized accelerometer signal during a vibration of the computing device.

In yet other embodiments, a computer-implemented system is set forth. The computer implemented system can include a first phase lock loop and a second phase lock loop. Each of the first phase lock loop and second phase lock loop can be configured to receive an accelerometer signal and phase shifted accelerometer signal, respectively. Additionally, each of the first phase lock loop and the second phase lock loop can be further configured to provide a lock signal when a frequency of each of a digitized accelerometer signal and a digitized phase shifted accelerometer signal match a frequency of each oscillator signal provided by the first phase lock loop and the second phase lock loop, respectively.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
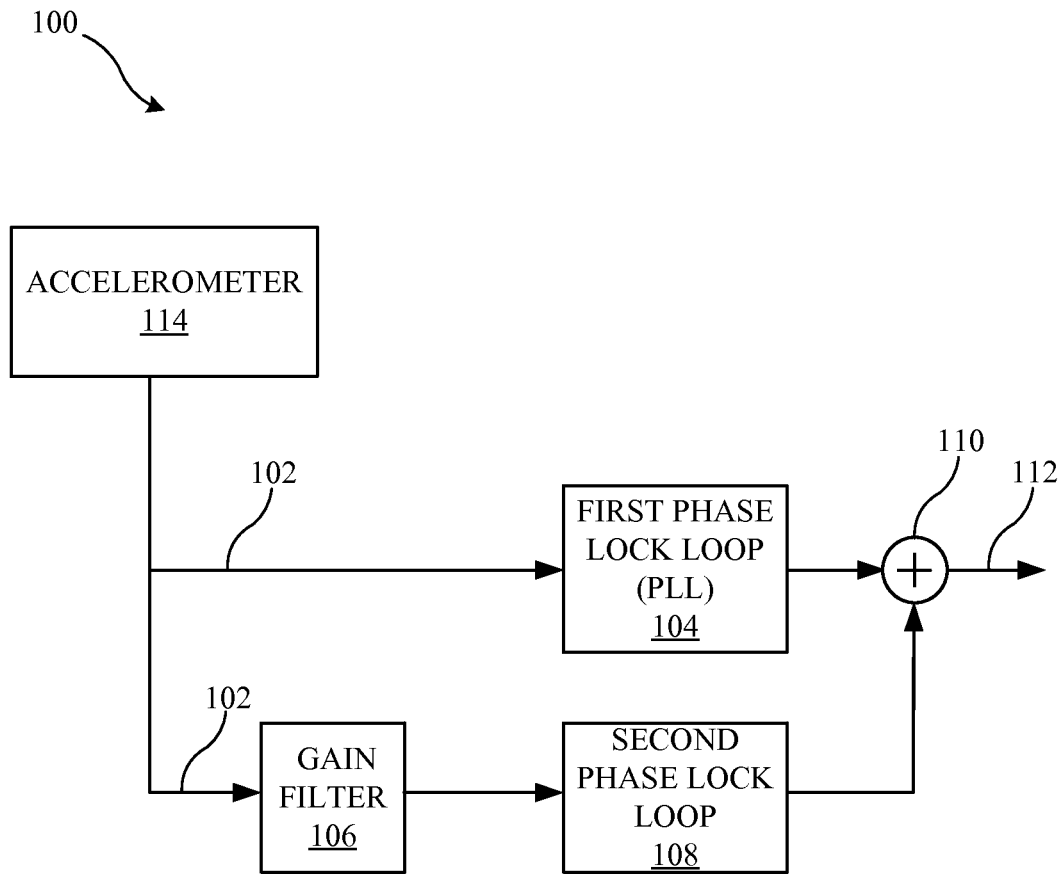
FIG. 1 shows a block diagram of a wobble detector utilizing two phase lock loops (PLLs), in accordance with some embodiments discussed herein.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate to a phase lock loop (PLL) for wobble detection occurring at a computing device. The PLL can use one or more accelerometer outputs to detect when a pure, exponentially-damped sinusoidal acceleration is present in any axis, such as x, y, and z axis. A natural vibration, not directly induced by a human, at a surface upon which the computing device rests will express itself as this type of signal from accelerometers. Accordingly, a PLL can be configured to lock onto this type of a signal in order to provide feedback for other functions of the computing device such as illuminating lights on the computing device. When the PLL is employed to provide feedback during instances of natural vibration, it is usually desirable for the natural vibration to be detected with as little latency as possible so that the phase locking can occur almost concurrently with the vibration. Therefore, the first goal is to determine that a motion is a natural, wobble motion and the second goal is to make the determination quickly with as little latency as possible. When these two goals are achieved, the PLL can be responsive to non-user induced motions that are associated with natural vibrations occurring at the computing device.

The PLL can generate an oscillating output signal that matches the phase and frequency of a sinusoidal input signal (e.g., an output of an accelerometer). Because of this property, a PLL can be employed to detect when a signal becomes sinusoidal, and hence can be used in the detection of a wobble motion, which is typically manifested as a pure, exponentially-damped sinusoidal acceleration. The PLL can be realized in hardware, utilizing a phase-frequency detector, a charge pump, a voltage-controlled oscillator, and a passive or active filter. However, the PLL can also be implemented as a relatively simple closed-loop controller in software. Furthermore, because the PLL can be code and not hardware, the software-defined PLL has advantages that can be leveraged by a wobble detection algorithm. For example, using phase seeding and conditional locking, latency in wobble detection can be reduced in accordance with some embodiments described in the present disclosure.

FIG. 1 shows a block diagram 100 of a wobble detector utilizing two phase lock loops (PLLs), a first phase lock loop 104 and a second phase lock loop 108, in accordance with some example embodiments discussed herein. In one embodiment, block diagram 100 can be characterized as a PLL-based wobble detection system for a single accelerometer axis. The first phase lock loop 104 and the second phase lock loop 108 are configured to receive as an input the same accelerometer signal 102 from the accelerometer 114. However, the accelerometer signal 102 can be shifted 180 degrees using a gain filter 106. In some embodiments, the gain filter 106 is a negative unity gain constant filter connected to the second phase lock loop 108. Additionally, each of the first phase lock loop 104 and the second phase lock loop 108 can output a binary signal, with a high signal (e.g., 1) signifying phase lock, and hence wobble detection, and a low signal (e.g., 0) signifying no phase lock. The output binary signals from each of the first phase lock loop 104 and the second phase lock loop 108 are provided to an adder 110 and thereafter output as the wobble detection signal 112, which can be either 0, 1, or 2. When the wobble detection signal is zero, no wobble is detected. However, when the wobble detection signal 112 is greater than zero, wobble has been detected.

A computing device can incorporate at least three accelerometers 114 and at least two PLL's in parallel per accelerometer. The paired PLLs (such as the first phase lock loop 104 and the second phase lock loop 108) take as their input the accelerometer signal and a phase shifted accelerometer signal in order to reduce latency when providing the wobble detection signal 112. For example, given a single PLL, it will naturally take longer to lock to a sinusoidal signal that is 180 degrees out of phase with its initial center frequency, than an input signal that is in phase. This idea can be extended to any number of PLLs per accelerometer axis, arbitrarily spaced in phase. However, spacing a pair by 180 degrees is most readily achieved by simply filtering the accelerometer input through a negative unity gain constant filter (e.g., gain filter 106) as depicted in FIG. 1. In this way, there is exactly zero time delay applied to the phase-shifted input signal. In some embodiments, more than two PLL's per accelerometer axis can be used in parallel.

Figure 2:
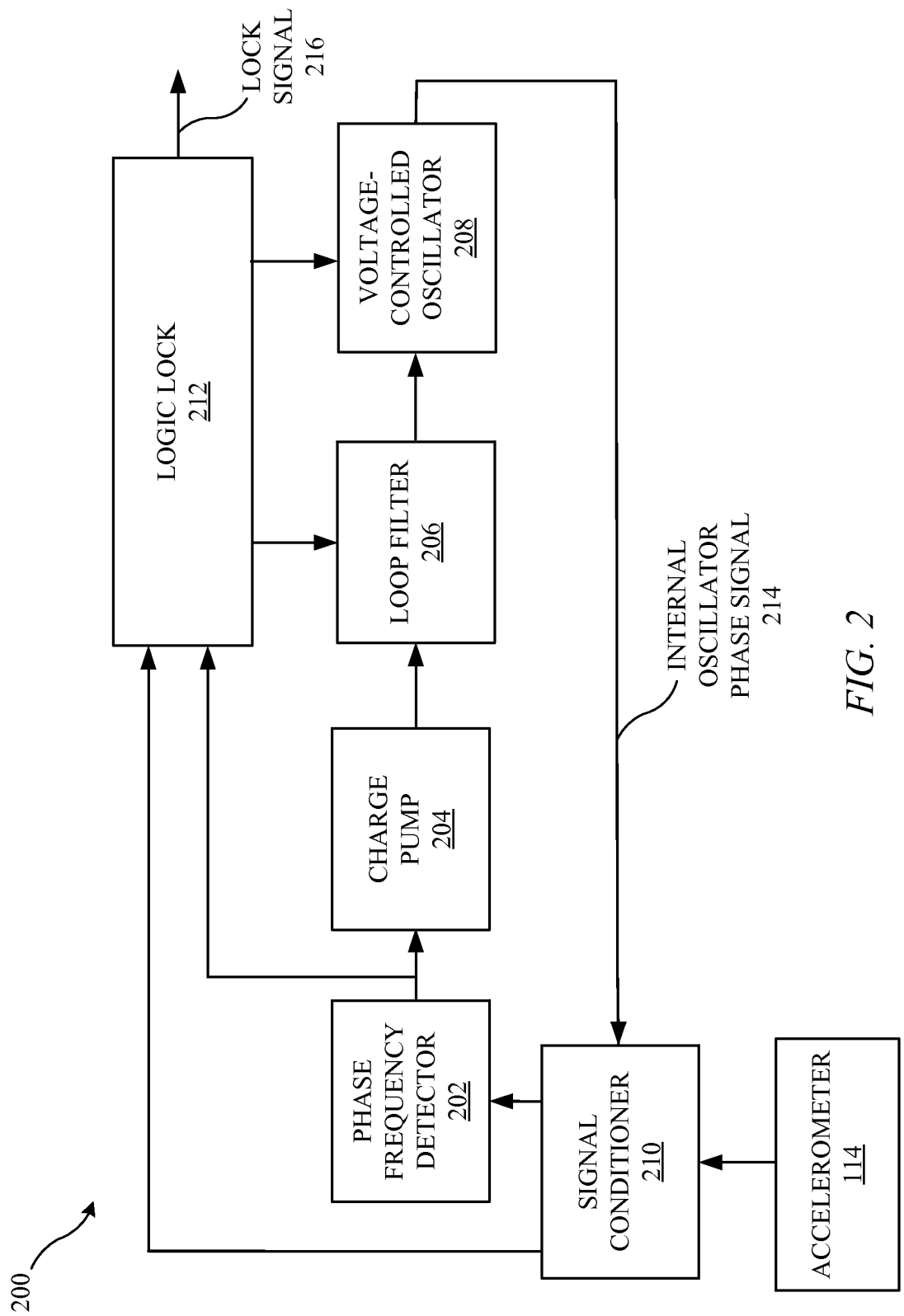
FIG. 2 shows a block diagram of a wobble-detect phase lock loop, in accordance with some embodiments discussed herein.

FIG. 2 shows a block diagram 200 of a wobble-detect PLL or PLL, such as the first phase lock loop 104 and the second phase lock loop 108 of FIG. 1, in accordance with some example embodiments. The PLL can include a phase-frequency detector (PFD) 202, a charge pump (CP) 204, a loop filter (LF) 206, and a voltage-controlled oscillator (VCO) 208. In addition to these components, the PLL also includes a signal conditioner (SC) 210 and a lock logic (LL) 212, as further discussed herein. In some embodiments, all of these components can be implemented in software. FIG. 2 further illustrates how an input of the PLL can be the accelerometer 114, an output of the VCO 208 can be the internal oscillator phase signal 214, and an output of the lock logic 212 can be the lock signal 216. The resulting lock signal 216 can be used for various functions of a computing device in which the PLL can be operable.

Figure 3:
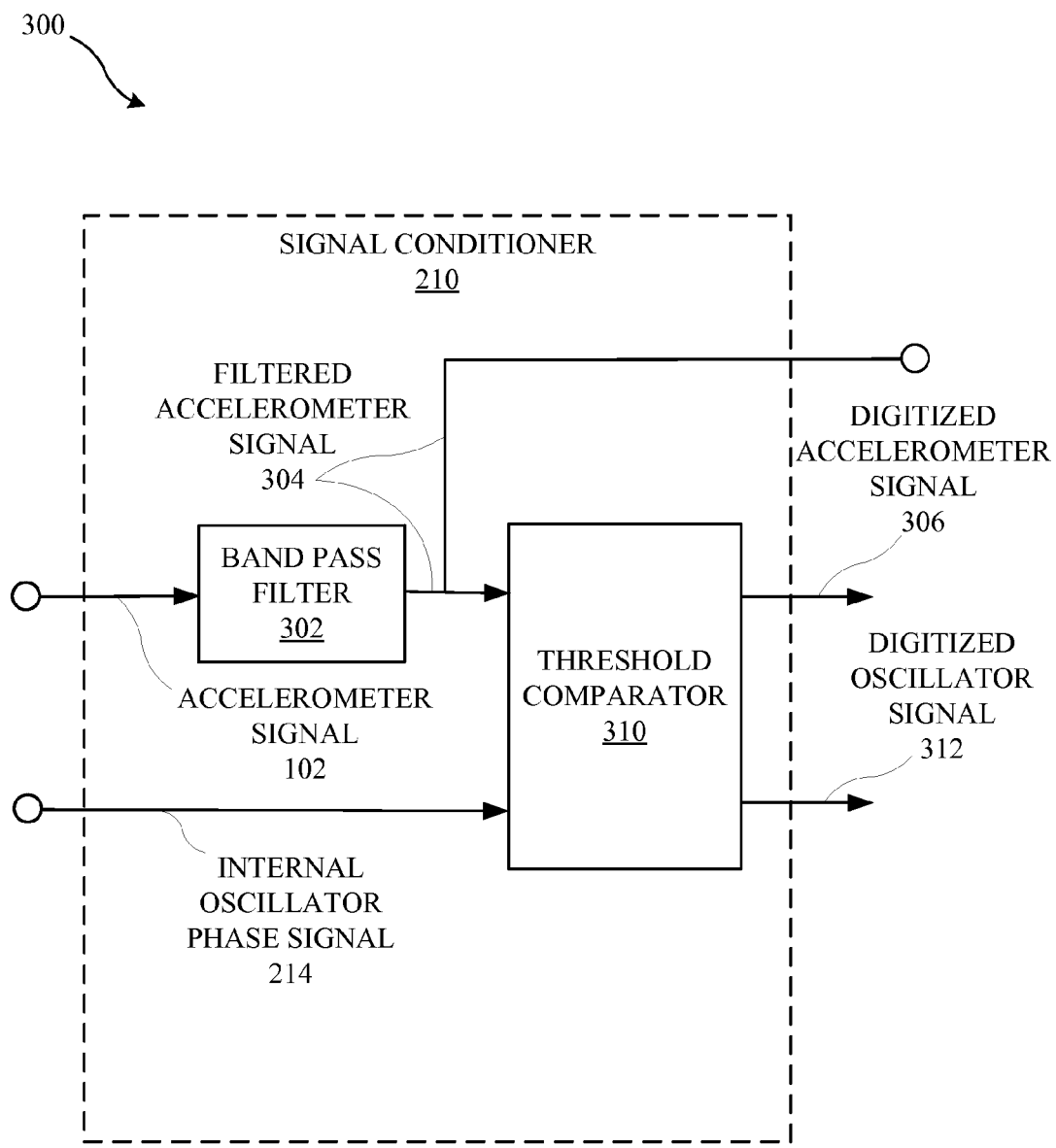
FIG. 3 shows a block diagram of a signal conditioner (SC), in accordance with some embodiments discussed herein.

FIG. 3 shows a block diagram 300 of the signal conditioner 210 from FIG. 1, in accordance with some example embodiments. In FIG. 3, the inputs of the signal conditioner (SC) are the accelerometer signal 102 (or the 180 degree phase shifted accelerometer signal), and the internal oscillator phase signal 214 from the VCO 208. The band-pass filter (BPF) 302 is configured to remove any direct current components of the accelerometer signal 102, making the accelerometer signal 102 zero-mean, and roll off or remove certain high frequencies. The high frequencies that can be rolled off or removed can include those frequencies not associated with vibrations of interest for differentiating between direct human-induced vibrations and naturally occurring vibrations (i.e., wobble), such as those greater than 1 megahertz. The output of the VCO 208 can be zero-mean by design. The resulting filtered accelerometer signal 304 is provided to a threshold comparator 310, and to other portions of the PLL. The threshold comparator 310 can be configured to compare the filtered accelerometer signal 304 and the internal oscillator phase signal 214 to a constant variable such as zero in order to digitize the inputs. If the filtered accelerometer signal 304 is greater than zero, then the output of the threshold comparator 310 is 1 for the digitized accelerometer signal, but if the filtered accelerometer signal is less than or equal to zero then the output of the threshold comparator 310 is 0 for the digitized accelerometer signal 306. This also applies to the internal oscillator phase signal 214 and the digitized oscillator phase signal 312, respectively. The outputs of the threshold comparator 310 will therefore be digitized versions of the accelerometer signal 102 (digitized accelerometer signal 306) and the internal oscillator phase signal 214 (digital oscillator phase 310). Digitized outputs further help to reduce latency in wobble detection and phase locking.

Figure 4:
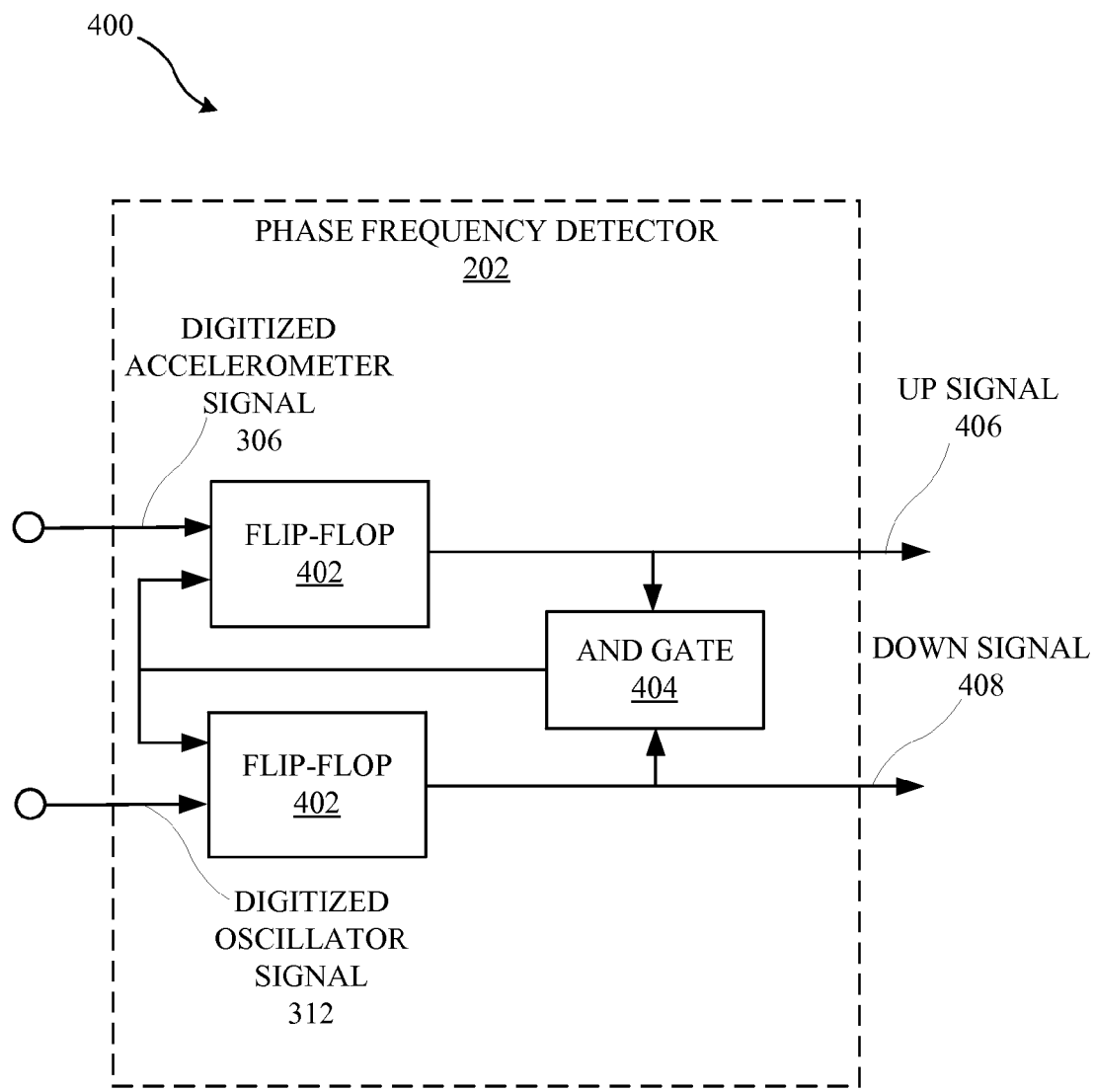
FIG. 4 shows a block diagram of a phase-frequency detector (PFD), in accordance with some embodiments discussed herein.

FIG. 4 shows a block diagram of a phase-frequency detector 202, in accordance with some example embodiments. In FIG. 4, the phase-frequency detector 202 is shown as a software implementation using two set/reset flip-flops 402 and an AND gate 404. The inputs to each flip flop 402 are the digitized accelerometer signal 306 and the digitized oscillator signal 312, and the outputs are binary signals including an up signal 406 and a down signal 408. The phase-frequency detector 202 is a component of the PLL that determines whether or not the VCO 208, or internal oscillator of the computing device, needs to increase or decrease in frequency, in order to match the phase of the input signal, and hence achieve phase lock. A positive value for the up signal 406 implies that the VCO 208 is lagging the input signal, and hence needs to increase in frequency. Alternatively, a positive value for the down signal 408 implies the VCO 208 phase is leading the input signal and hence needs to decrease in frequency. For example, when both the digitized accelerometer signal 306 and digitized oscillator signal 312 are concurrently high binary values (e.g., 1), a binary low value (e.g., 0) is output from each flip flop 402 causing the AND gate 404 to stay at a binary low value (e.g., 0). Additionally, each of the up signal 406 and down signal 408 will remain at a binary low value, thus not affecting the VCO 208 phase. However, when digitized oscillator signal 312 is a binary high value and the digitized accelerometer signal 306 is a binary low value, there is an assumption that phase lock has not been achieved. As a result, the down signal 408 will be a binary high value and the up signal 406 will be a binary low value, thereby causing the VCO 208 phase to decrease or move "down" in frequency in order to lock phase with the accelerometer signal 102.

Figure 5:
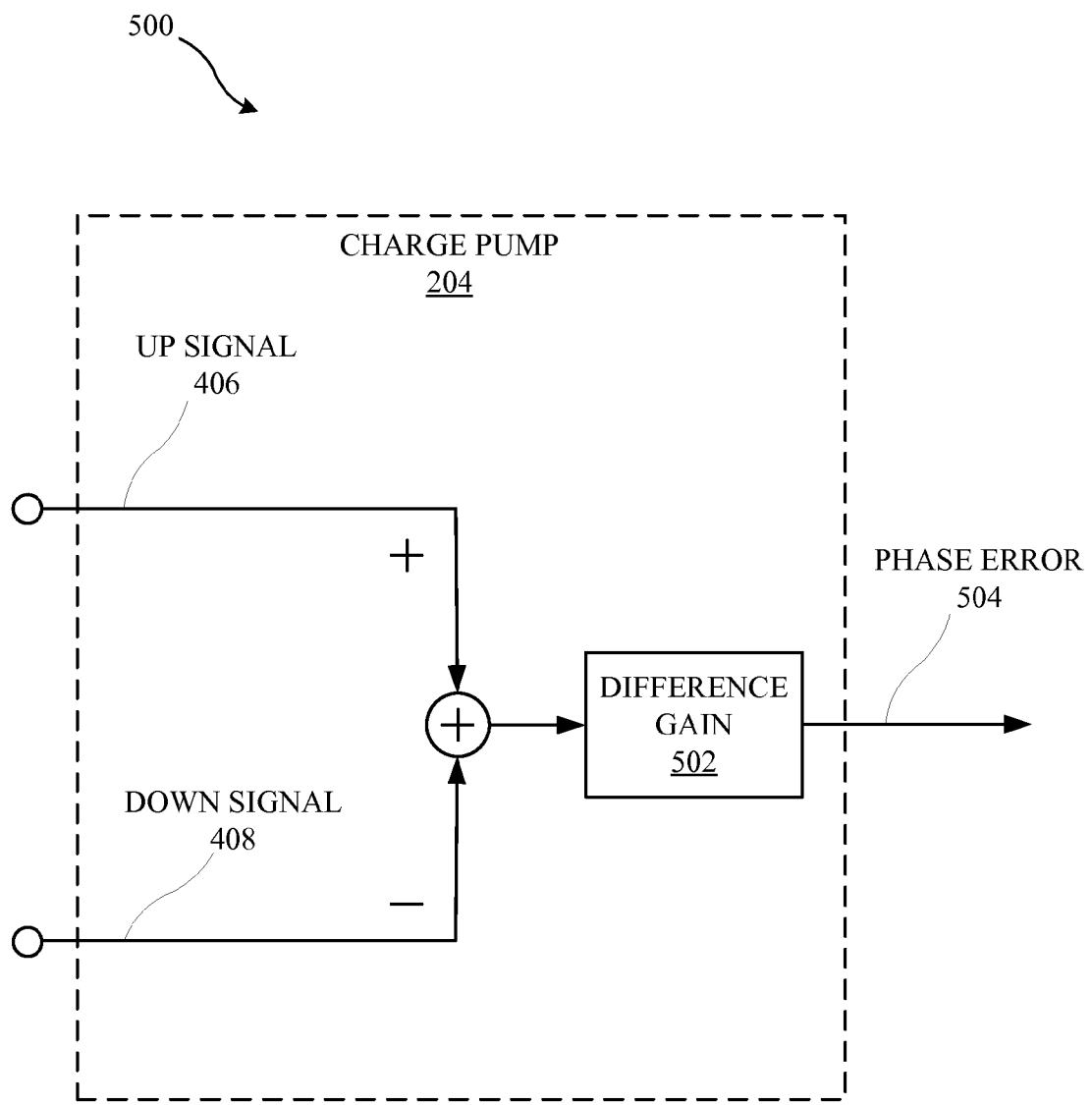
FIG. 5 shows a block diagram of a charge pump (CP), in accordance with some embodiments discussed herein.

FIG. 5 shows a block diagram of the charge pump 204, in accordance with some example embodiments. Specifically, FIG. 5 sets forth how the charge pump 204 receives the up signal 406 and down signal 408, and generates a phase error signal 504 based on the difference between the up signal 406 and down signal 408. In some embodiments, the up signal 406 and the down signal 408 are binary or digital values. The up signal 406 and a negative of the down signal 408 can be added together and supplied to a difference gain 502, which is configured to scale the resulting sum of the up signal 406 and negative down signal 408 by a gain value. The gain value can be any suitable gain value for ensuring that the phase error signal 504 is accurately defined prior to being input in to the loop filter 206.

Figure 6:
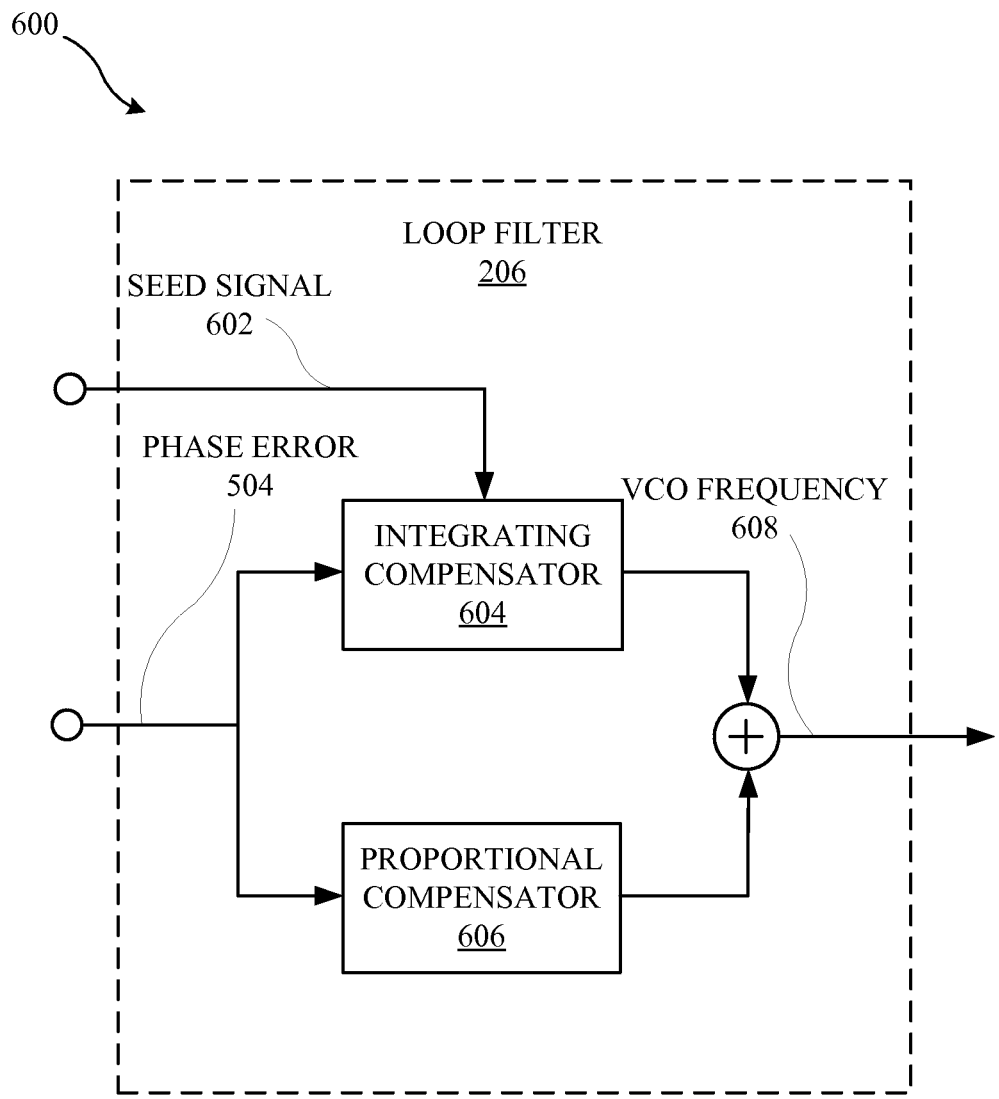
FIG. 6 shows a block diagram of a loop filter (LF), in accordance with some embodiments discussed herein.

FIG. 6 shows a block diagram of a loop filter 206 in accordance with some embodiments. The loop filter 206 can be a closed loop controller of the PLL. In FIG. 6, a proportional-integral (PI) controller is created by communicatively coupling an integrating compensator 604 and a proportional compensator 606. The integrating compensator 604 is bounded to define a range in which the frequency of the VCO 208 is allowed to change or iterate between. Additionally, the integrating compensator 604 is subject to being reset to zero per the seed signal 602 from the lock logic 212, as further discussed herein. The input of the loop filter 206 is the phase error signal 504 that is output from the charge pump 204. The resulting output of the loop filter 206 is the VCO frequency 608, which is the summation of the proportional compensator 606 output and the integrating compensator 604 output. Each of the proportional compensator 606 and the integrating compensator 604 are tuned in order to reduce the latency of the PLL. Additionally, when the loop filter 206 is performed by software, the integrator can be approximated using an accumulator with a sample-rate multiplier. As discussed herein, the integrator can be reset during iterations of the PLL in order to reduce latency in wobble detection for subsequent iterations of the PLL.

Figure 7:
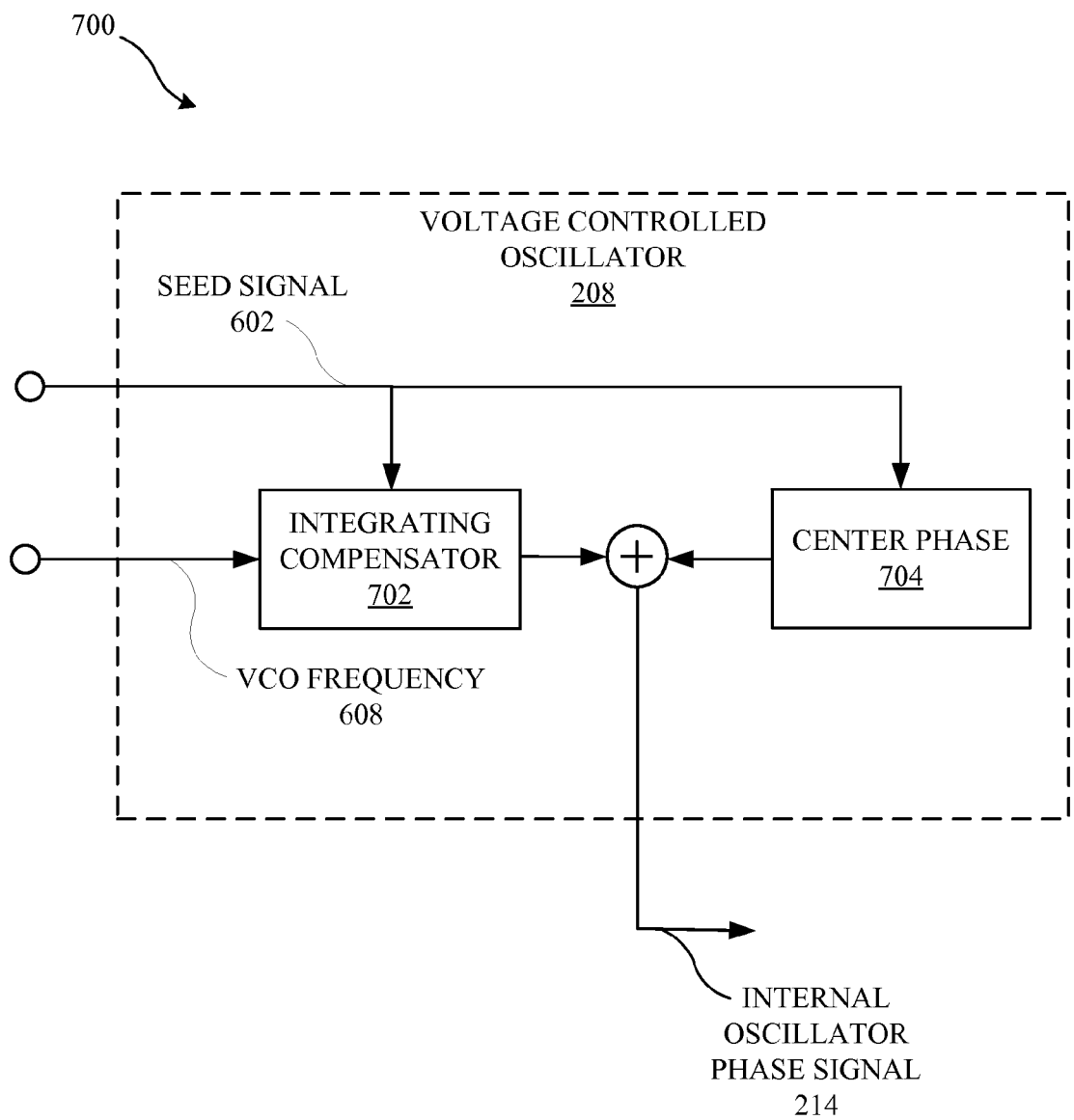
FIG. 7 shows a block diagram of a voltage-controlled oscillator (VCO), in accordance with some embodiments discussed herein.

FIG. 7 shows a block diagram of the voltage-controlled oscillator 208, in accordance with some example embodiments discussed herein. The voltage-controlled oscillator 208 receives the seed signal 602 and the VCO frequency 608 from the loop filter 206 as inputs, in order to generate the internal oscillator phase signal 214. The VCO frequency 608 is integrated, multiplied by a tunable gain value, converted to phase, and thereafter added to a center phase 704. The center phase 704 can remain a constant output that is subject to seeding by the seed signal 602 in order to reduce latency between the instances of phase locking. Therefore the output of the VCO 208 (i.e., the internal oscillator phase signal 214) can be represented as the integrated VCO frequency plus the center phase 704. As with the proportional and integral features of the loop filter 206, the integration can be implemented as an accumulator with a sample-rate multiplier. However, unlike the integrating compensator 604 of the loop filter 206, however, the integrating compensator 702 is not bounded in the same way. Rather, since the output of the integrating compensator 702 is phase of a sinusoid, it is naturally bounded by wrapping: $\phi > 2\pi \Rightarrow \phi = (\phi \mod 2\pi)$, where $\phi$ is the internal oscillator phase signal 214. Phase wrapping is also applied to the output of the VCO 208, the internal oscillator phase signal 214 ("phase") as: phase > $2\pi \Rightarrow$ phase=(phase mod $2\pi$). Whenever the lock logic 212 provides a phase seeding signal, the center phase 704 is set to a frequency guess or estimate, the integrating compensator 702 is reset to zero, and the internal oscillator phase signal 214 is set to either zero or $\pi$ radians, as appropriate. In this way, the latency of wobble-detect PLL can be decreased between iterations of the PLL.

Figure 8:
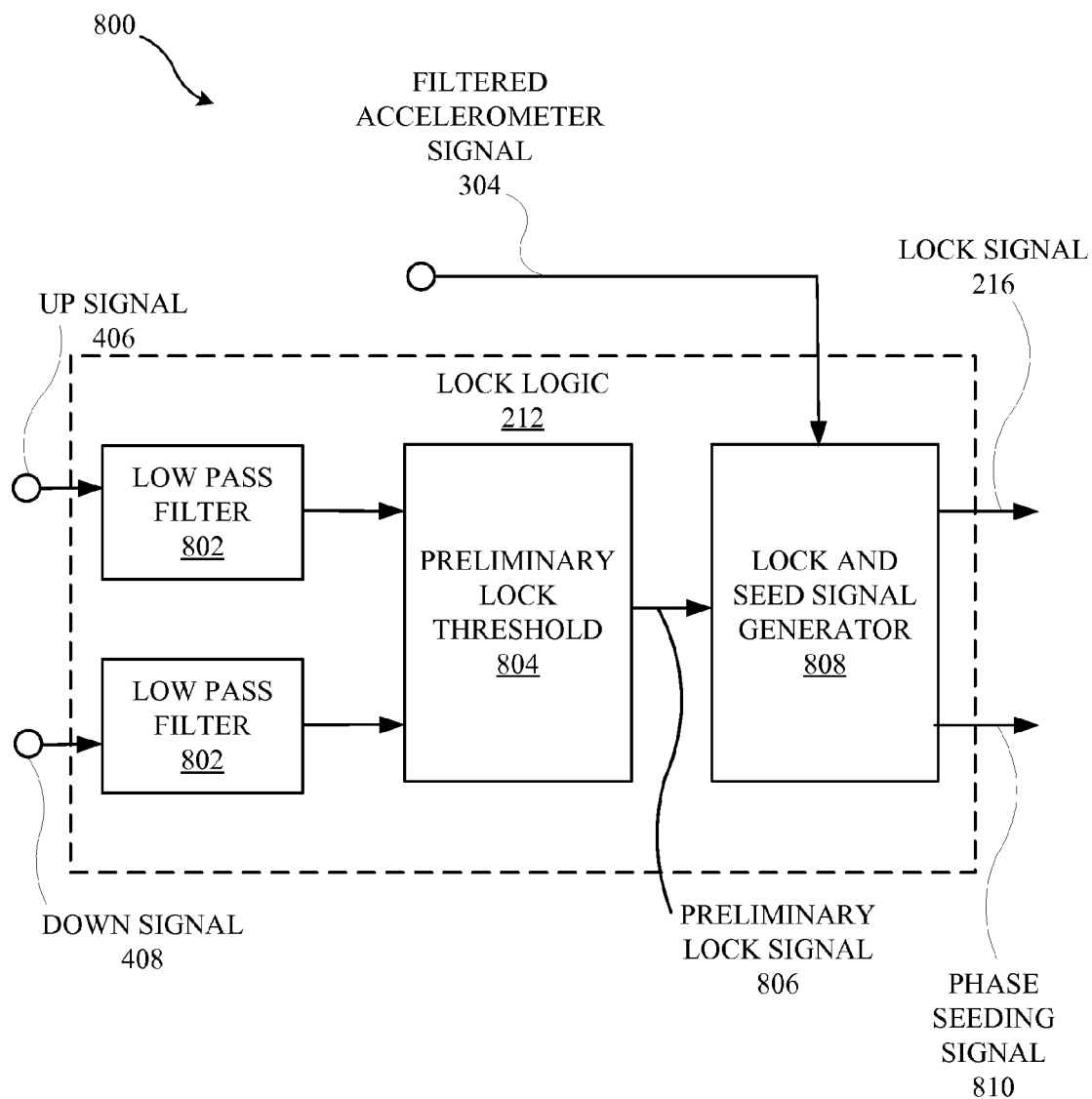
FIG. 8 shows a block diagram of a lock logic, in accordance with some embodiments discussed herein.

FIG. 8 shows a block diagram 800 of the lock logic 212, in accordance with some example embodiments. The lock logic 212 determines whether the PLL (e.g., the first phase lock loop 104 and/or the second phase lock loop 108 of FIG. 1) has locked, and hence detected wobble. It also determines when phase seeding should occur. The inputs to the lock logic 212 are the outputs of the phase-frequency detector 202, specifically the up signal 406 and the down signal 408. Additionally, the lock logic 212 receives the filtered accelerometer signal 304 from the signal conditioner 210. The two binary signals, the up signal 406 and the down signal 408, are filtered by a single-pole, no-zero, low pass filters 802, which provide an effective average amount of time that a phase or frequency defined by the internal oscillator phase signal 214 is above or below the phase or frequency of the digitized accelerometer signal 306. The resulting filtered up signal 406 and down signal 408 are thereafter provided to a preliminary lock threshold 804 in order to compare each signal to a preliminary lock threshold. The preliminary lock threshold allows the PLL to provide an estimate of whether the PLL has achieved lock according to how nominal the phase or frequency adjustments defined by the up signal 406 and down signal 408 are. For example, if the up signal 406 or the down signal 408 are constantly indicating that the internal oscillator signal 214 is staying above or below the phase of the accelerometer signal 102, then preliminary lock will have not been achieved. However, if the up signal 406 or the down signal 408 is constantly indicating that the internal oscillator signal 214 is staying approximately equal to the phase of the accelerometer signal 102, then preliminary lock will have been achieved.

A preliminary lock signal 806 is generated based on the comparison between the preliminary lock threshold and the filtered up signal 406 and down signal 408. Both the preliminary lock signal 806 and the filtered accelerometer signal 304 are provided to the lock signal generator 808. When there is no wobble, the filtered accelerometer signal 304 will not resemble a sinusoid; however, peak tracking and a frequency guess are determined by treating filtered accelerometer signal 304 as if it were a pure sinusoid. If both the computed peak and frequency for the filtered accelerometer signal 304 are above a tunable threshold of the lock signal generator 808, then one of two options is performed. In the first option, if preliminary lock had been achieved, then lock is asserted by outputting the lock signal 216. Otherwise, in the second option, if preliminary lock had not been achieved, then the phase is seeded or reset by outputting the phase seeding signal 810 to the loop filter 206 and the VCO 208. The phase seeding signal 810 can cause the internal oscillator phase signal 214 to reset to zero or $\pi$ radians, based on whether the direction of the last zero-crossing of internal oscillator phase signal 214 was from below or from above zero, respectively.

The lock signal 216 can be used thereafter to enhance various functions of the computing device in which the PLL can be implemented. For example, because the vibrations of a surface are typically sinusoidal and therefore lockable by the PLL, the lock signal 216 can be output and used for providing a surface vibration indicator to the computing device. By using multiple PLL's per accelerometer and seeding or resetting the phase, reduced latency in vibration detection for the computing device is achieved. The surface vibration indicator can cause lights on the computing device to illuminate, or block illumination, during the period of vibration and lock, or cause other signals to be provided from the computing device such as wireless signals, audio signals, or any other suitable signal for notifying a user of the occurrence of natural vibration.

Figure 9:
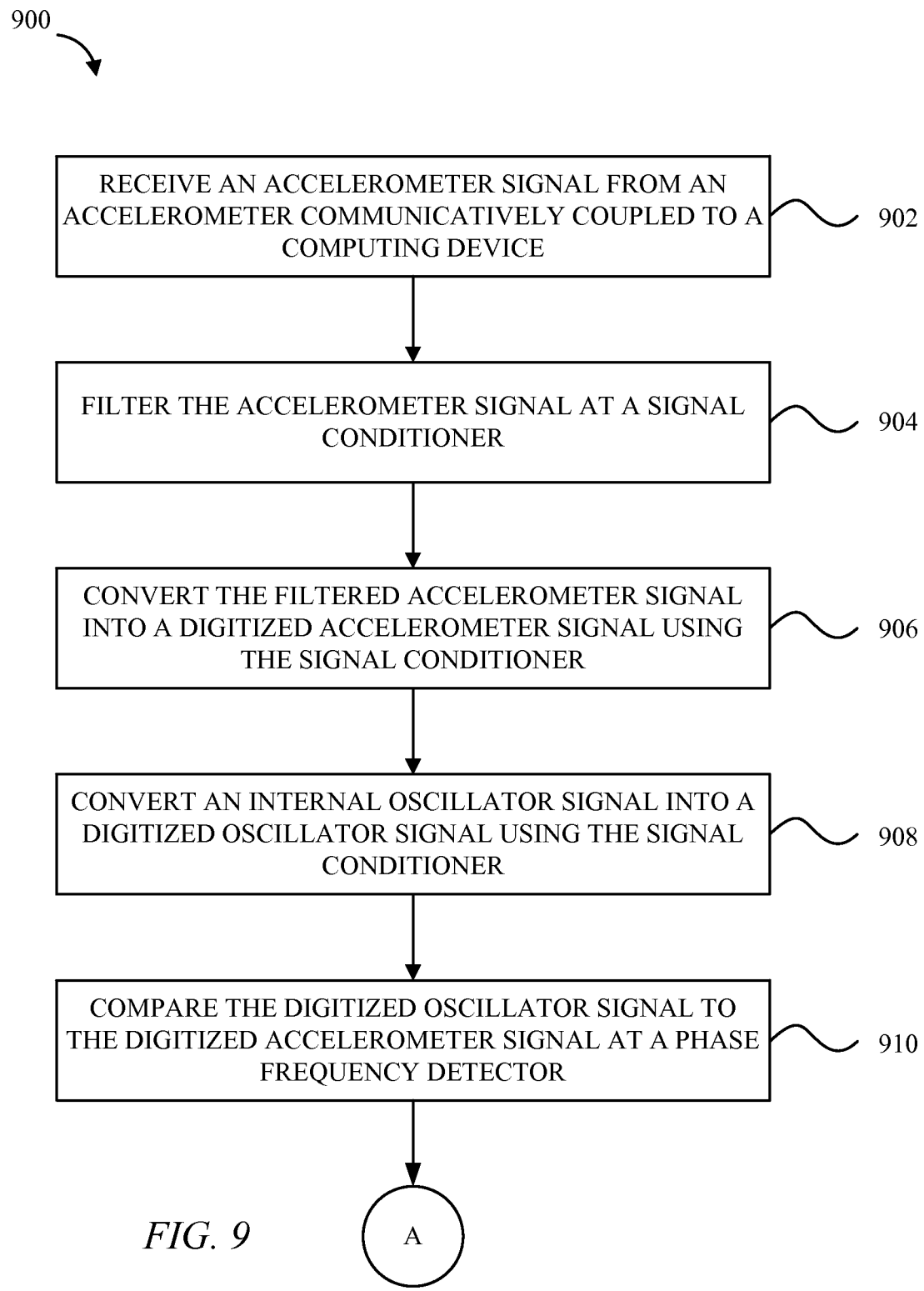
FIG. 9 shows a method for providing a lock signal or seed signal from a wobble-detect PLL according to any of the embodiments discussed herein.

FIG. 9 illustrates a method 900 for providing a lock signal or seed signal from a wobble or vibration detecting PLL according to any of the embodiments discussed herein. The method 900 can be performed by a controller, computing device, PLL, or any other apparatus, system, or device discussed herein. The method 900 includes a step 902 of receiving an accelerometer signal from an accelerometer communicatively coupled to a computing device. At step 904, the accelerometer signal is filtered at a signal conditioner, as further discussed herein, in order to remove a direct current component of the accelerometer signal and remove high frequencies from the accelerometer signal. In this way, the PLL will not attempt to lock onto an accelerometer signal of high frequency (e.g., frequencies above 20 hertz), which was likely not induced by a wobble or natural vibration from a surface. At step 906, the filtered accelerometer signal is converted into a digitized accelerometer signal using the signal conditioner. By digitizing the accelerometer signal, the PLL is able to be implemented in software for reducing latency when locking onto certain accelerometer signals. At step 908, an internal oscillator signal is also digitized using the signal conditioner in order to be later compared to the digitized accelerometer signal, as further discussed herein. At step 910, the digitized accelerometer signal and the digitized oscillator signal are compared at a phase frequency detector. It should be noted that the method 900 continues at FIG. 10, as indicated by the transition step "A" provided in FIG. 9 and FIG. 10.

Figure 10:
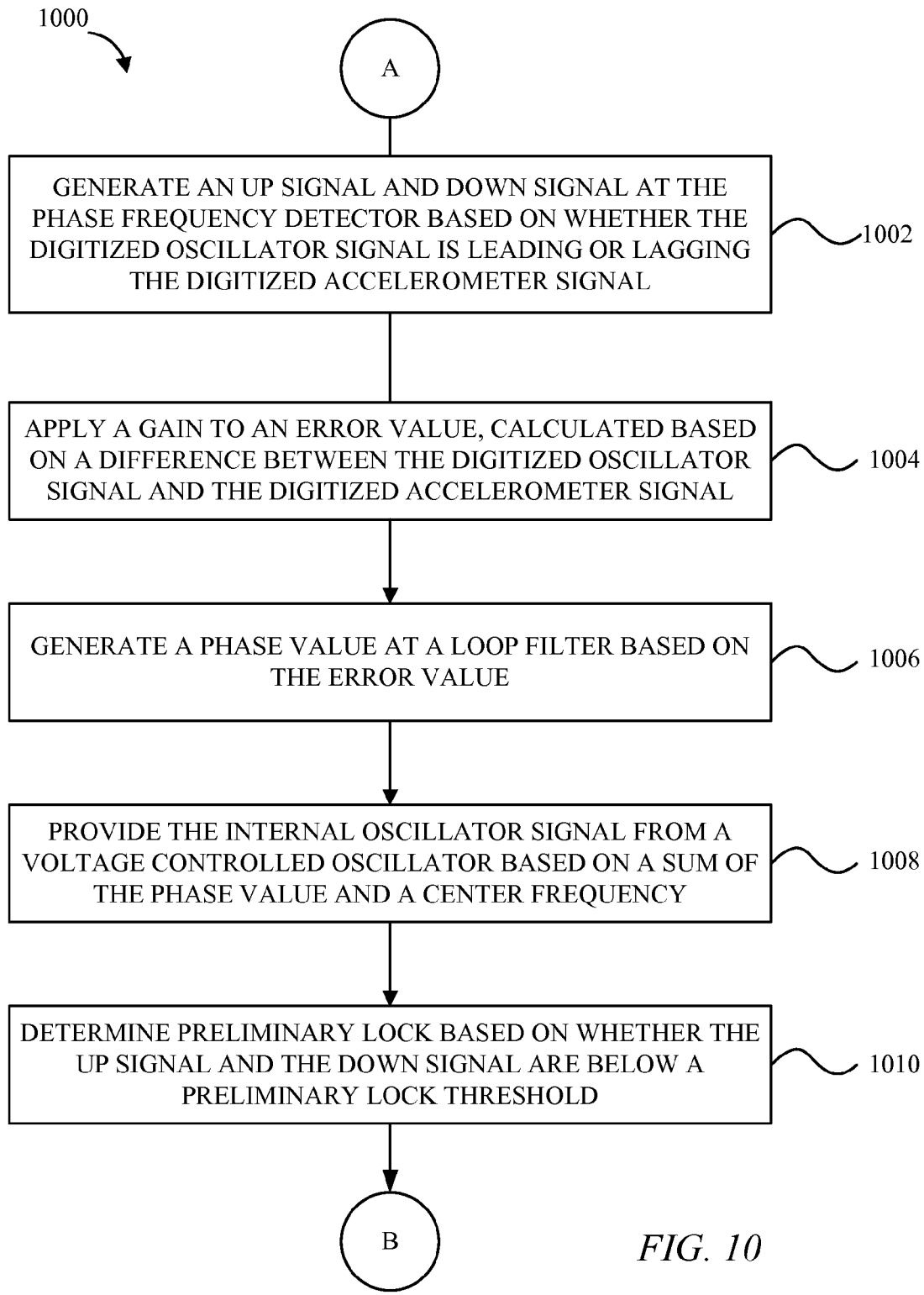
FIG. 10 shows a method for providing a lock signal or seed signal from a wobble-detect PLL according to any of the embodiments discussed herein.

FIG. 10 illustrates a method 1000, which is a continuation of the method 900 from FIG. 9. The method 1000 proceeds from step 910 of method 900, and includes a step 1002 of generating an up signal and a down signal at the phase frequency detector based on whether the digitized oscillator signal is leading or lagging the digitized accelerometer signal. At step 1004, a gain is applied to an error value calculated based on a difference between the up signal and the down signal. At step 1006, a phase value is generated at a loop filter based on the error value. At step 1008, the internal oscillator signal is generated at a voltage controlled oscillator based on a sum of the phase value and a center frequency, provided to reduce latency in phase estimates for use by the internal oscillator signal. In this way, the internal oscillator signal represents an attempt to match or lock on the accelerometer signal by providing a signal comparable to the accelerometer signal. Therefore, the lower the error value, the more likely that the internal oscillator signal matches the accelerometer signal. At step 1010, preliminary lock is determined based on whether the up signal and down signal, provided by the phase frequency detector, are below a preliminary lock threshold. When the up signal and down signal (or the average of both) are above the preliminary lock threshold, the phase or frequency of the internal oscillator signal should be adjusted in order to match the accelerometer signal. However, when the up signal and down signal are below or equal to the preliminary lock threshold, the phase or frequency of the internal oscillator signal is within a tolerance of the phase or frequency of the accelerometer signal, thereby indicating preliminary lock. It should be noted that the method 1000 continues at FIG. 11, as indicated by the transition step "B" provided in FIG. 10 and FIG. 11.

Figure 11:
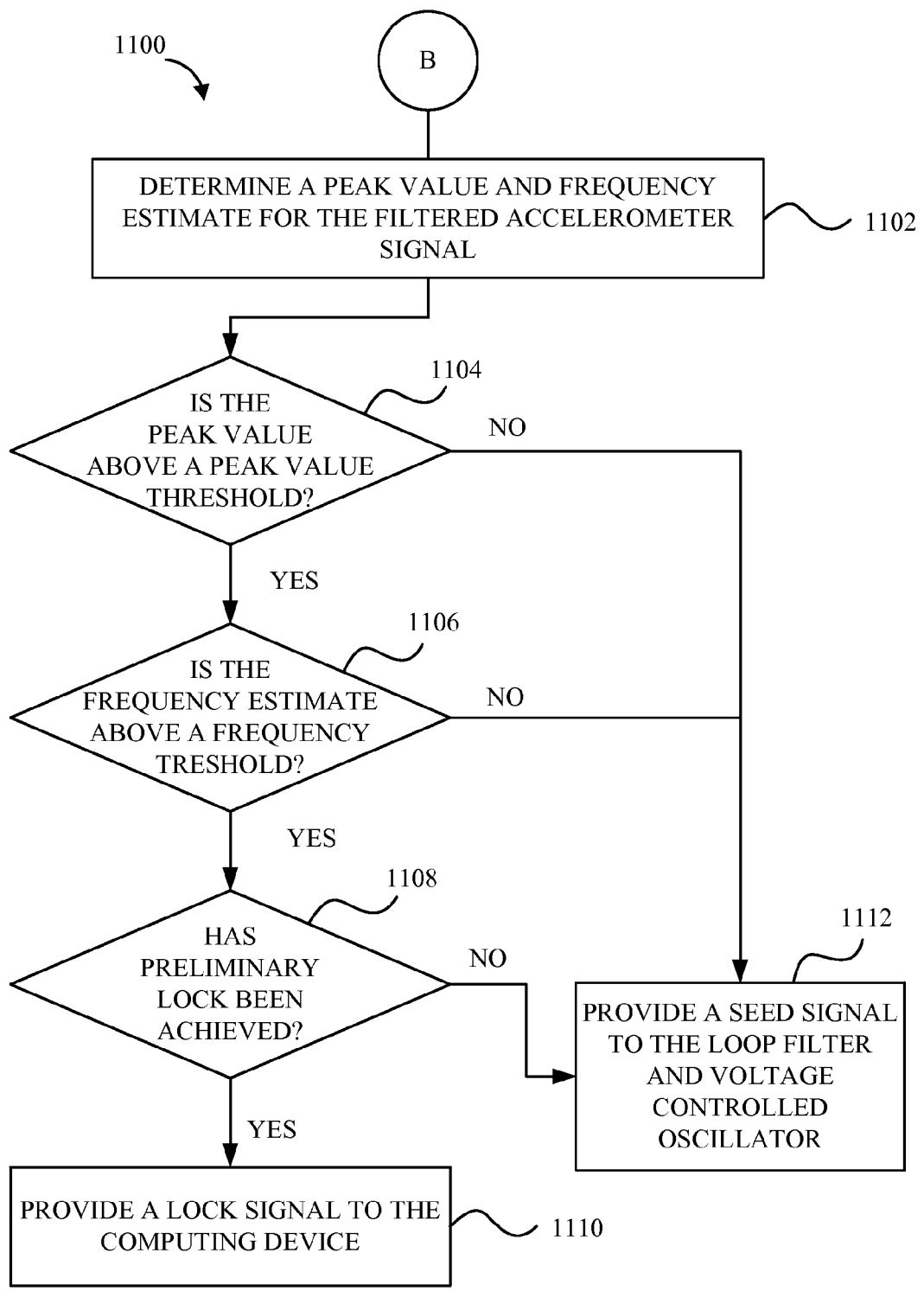
FIG. 11 shows a method for providing a lock signal or seed signal from a wobble-detect PLL according to any of the embodiments discussed herein.

FIG. 11 illustrates a method 1100, which is a continuation of the method 900 and method 1000 from FIG. 9 and FIG. 10, respectively. The method 1100 proceeds from step 1010 of method 1000, and includes a step 1102 of determining a peak value and frequency estimate for the filtered accelerometer signal. At step 1104, a determination is made as to whether the peak value is above a peak value threshold. If the peak value is not above the peak value threshold, then at step 1112 a seed signal is provided to the loop filter and the voltage controlled oscillator in order to seed or reset an integrated error value and the center frequency, respectively, for the next iteration of the PLL. When the peak value is below the peak value threshold, the accelerometer is likely generating noise and therefore the PLL can be configured to not provide a lock signal in such a case. If the peak value is equal to or above the peak value, then at step 1106, a determination is made as to whether the frequency estimate is above a frequency threshold. If the frequency estimate is not above the frequency threshold, then the step 1112 is performed. However, if the frequency estimate is equal to or above the frequency threshold, then at step 1108, a determination is made as to whether preliminary lock has been achieved (as determined from step 1010 of method 1000). If preliminary lock has not been achieved then step 1112 is performed. If preliminary lock has been achieved, then at step 1110, a lock signal is provided to the computing device. The lock signal essentially indicates that sinusoidal properties in the accelerometer were detected as a result of the internal oscillator signal substantially locking or matching the accelerometer signal. Substantially locking or matching can refer to when the phase or frequency of the internal oscillator signal is equal to or within a tolerance (e.g., plus or minus a tolerance value) of the accelerometer signal. Such detection is useful when differentiating between a direct human made vibration (typically not having pure sinusoidal properties) and a natural vibration (e.g., the wobble or vibration occurring on a hard surface).

Figure 12:
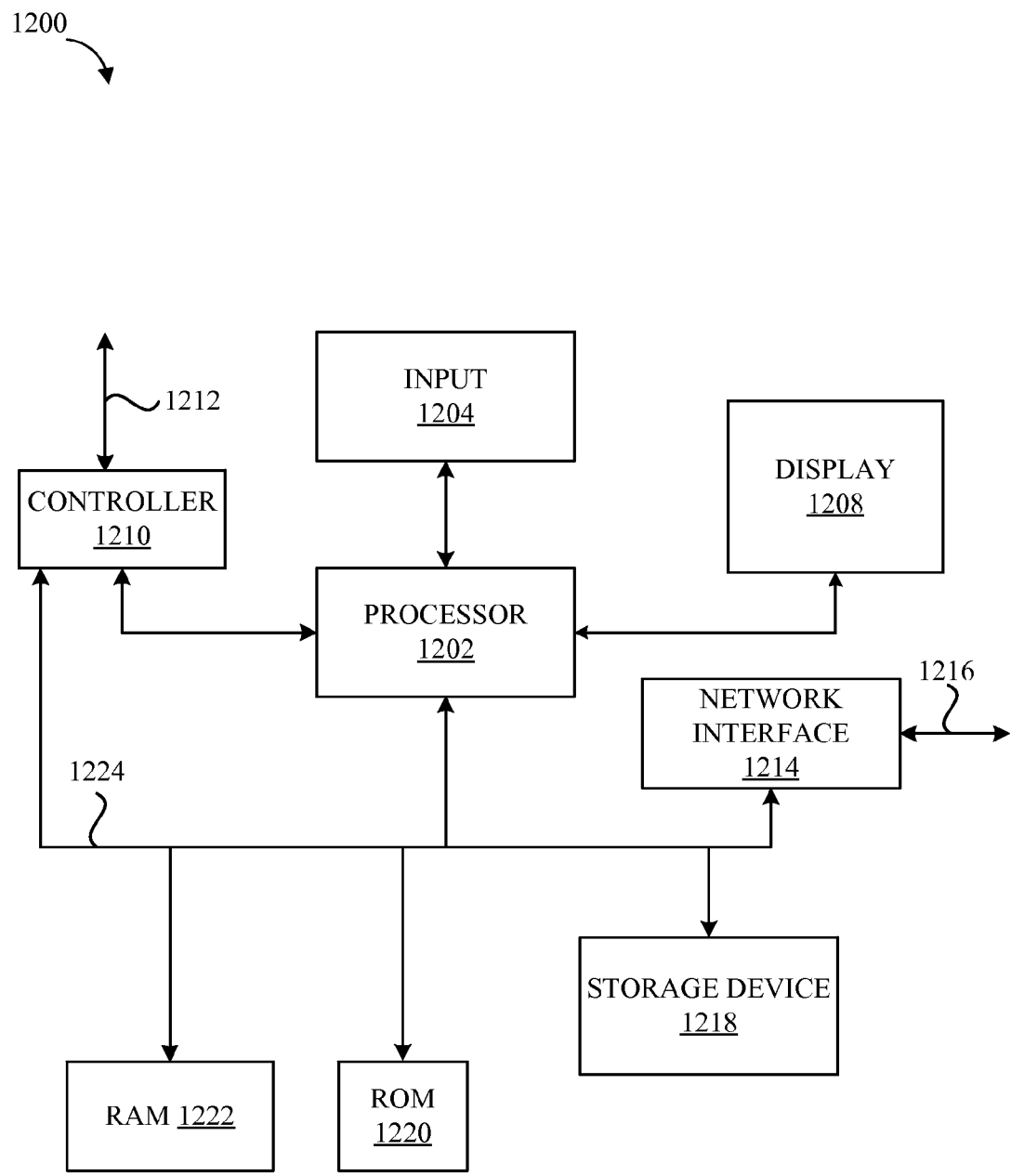
FIG. 12 is a block diagram of a computing device that can represent the components of the computing device hosting the wobble-detect PLL, or any other system or apparatus discussed herein responsible for wobble detection.

FIG. 12 is a block diagram of a computing device 1200 that can represent the components of the computing device hosting one or more of the PLL's, or any other system or apparatus discussed herein responsible for wobble detection. It will be appreciated that the components, devices or elements illustrated in and described with respect to FIG. 12 may not be mandatory and thus some may be omitted in certain embodiments. The computing device 1200 can include a processor 1202 that represents a microprocessor, a coprocessor, circuitry and/or a controller for controlling the overall operation of computing device 1200. Although illustrated as a single processor, it can be appreciated that the processor 1202 can include a plurality of processors. The plurality of processors can be in operative communication with each other and can be collectively configured to perform one or more functionalities of the computing device 1200 as described herein. In some embodiments, the processor 1202 can be configured to execute instructions that can be stored at the computing device 1200 and/or that can be otherwise accessible to the processor 1202. As such, whether configured by hardware or by a combination of hardware and software, the processor 1202 can be capable of performing operations and actions in accordance with embodiments described herein.

The computing device 1200 can also include user input device 1204 that allows a user of the computing device 1200 to interact with the computing device 1200. For example, user input device 1204 can take a variety of forms, such as a button, keypad, dial, touch screen, audio input interface, visual/image capture input interface, input in the form of sensor data, etc. Still further, the computing device 1200 can include a display 1208 (screen display) that can be controlled by processor 1202 to display information to a user. Controller 1210 can be used to interface with and control different equipment through equipment control bus 1212. The computing device 1200 can also include a network/bus interface 1214 that couples to data link 1216. Data link 1216 can allow the computing device 1200 to couple to a host computer or to accessory devices. The data link 1216 can be provided over a wired connection or a wireless connection. In the case of a wireless connection, network/bus interface 1214 can include a wireless transceiver.

The computing device 1200 can also include a storage device 1218, which can have a single disk or a plurality of disks (e.g., hard drives) and a storage management module that manages one or more partitions (also referred to herein as "logical volumes") within the storage device 1218. In some embodiments, the storage device 1218 can include flash memory, semiconductor (solid state) memory or the like. Still further, the computing device 1200 can include Read-Only Memory (ROM) 1220 and Random Access Memory (RAM) 1222. The ROM 1220 can store programs, code, instructions, utilities or processes to be executed in a non-volatile manner. The RAM 1222 can provide volatile data storage, and store instructions related to components of the storage management module that are configured to carry out the various techniques described herein. The computing device 1200 can further include data bus 1224. Data bus 1224 can facilitate data and signal transfer between at least processor 1202, controller 1210, network interface 1214, storage device 1218, ROM 1220, and RAM 1222.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for detecting a vibration using one or more phase lock loops of a software-implemented control system, the method comprising:
    differencing an up signal and a down signal generated by a signal conditioner in a first phase lock loop of the one or more phase lock loops in order to provide an error signal for modifying the frequency of an oscillator signal to achieve a phase lock; and
    determining an accelerometer signal is sinusoidal when the oscillator signal generated by the one or more phase lock loops is phase locked with the accelerometer signal.

2. The method of claim 1, further comprising:
    modifying a frequency of the oscillator signal based on whether a phase of the oscillator signal is leading or lagging the accelerometer signal.

3. The method of claim 1, further comprising:
    applying a negative gain to the accelerometer signal provided to a first phase lock loop; and bypassing the negative gain for the accelerometer signal provided to a second phase lock loop.

4. The method of claim 1, further comprising:
    determining, when the oscillator signal is phase locked with the accelerometer signal, that the vibration is a natural vibration.

5. The method of claim 1, further comprising removing a direct current component of the accelerometer signal.

6. The method of claim 1, further comprising:
comparing the oscillator signal and the accelerometer signal using a plurality of flip-flops.

7. A machine-readable non-transitory storage medium storing instructions that, when executed by a processor included in a computing device, cause the computing device to carry out steps that include:
differencing an up signal and a down signal generated by a signal conditioner in a first phase lock loop in order to provide an error signal modifying a frequency of an oscillator signal to achieve a phase lock; and
providing a lock signal to the computing device when an accelerometer signal is phase locked with the oscillator signal, wherein the oscillator signal is an output from a voltage-controlled oscillator of the first phase lock loop configured to estimate the phase of the accelerometer signal during a vibration occurring at the computing device.

8. The machine-readable non-transitory storage medium of claim 7, wherein the accelerometer signal is phase locked with the oscillator signal when each of an up signal and a down signal, provided to modify the phase of the oscillator signal, are below a preliminary lock threshold.

9. The machine-readable non-transitory storage medium of claim 8, wherein each of the up signal and the down signal are filtered by a low pass filter before being compared to the preliminary lock threshold.

10. The machine-readable non-transitory storage medium of claim 7, wherein the lock signal is provided to the computing device based on whether a peak amplitude estimate and a frequency estimate are above an amplitude threshold and a frequency threshold, respectively.

11. The machine-readable non-transitory storage medium of claim 10, wherein the phase of the oscillator signal is seeded or reset at least based on whether the peak amplitude estimate and the frequency estimate are below the amplitude threshold or the frequency threshold.

12. The machine-readable non-transitory storage medium of claim 7, wherein the voltage-controlled oscillator estimates the phase of the accelerometer signal by comparing the accelerometer signal and the oscillator signal to generate one of an up signal and a down signal for increasing or decreasing a frequency of the oscillator signal.

13. The machine-readable non-transitory storage medium of claim 7, wherein the lock signal is provided from a combination of phase lock loops configured to receive a first accelerometer signal and a second accelerometer signal, wherein the second accelerometer signal is the first accelerometer signal multiplied by −1.

14. A computer-implemented system, comprising:
a first phase lock loop and a second phase lock loop configured to: i) receive an accelerometer signal and a phase shifted accelerometer signal, respectively, and ii) provide lock signals when a phase of each of the accelerometer signal and the phase shifted accelerometer signal substantially matches a phase of each oscillator signal provided by the first phase lock loop and the second phase lock loop, respectively,
and wherein differencing an up signal and a down signal generated by a signal conditioner of the first phase lock loop in order to provide an error signal for modifying the frequency of an oscillator signal to achieve a phase lock.

15. The computer-implemented system of claim 14, wherein the first phase lock loop includes a voltage-controlled oscillator configured to generate the oscillator signal based on whether the accelerometer signal is leading or lagging the oscillator signal.

16. The computer-implemented system of claim 14, wherein the first phase lock loop is configured to reset or seed a phase of the oscillator signal provided by the first phase lock loop when the phase of the oscillator signal, provided by the first phase lock loop, fails to match the phase of the accelerometer signal.

17. The computer-implemented system of claim 14, wherein the accelerometer signal and phase shifted accelerometer signal are based on an output of at least one accelerometer electrically coupled to a computing device hosting the computer-implemented system.

18. The computer-implemented system of claim 17, wherein each of the first phase lock loop and second phase lock loop are tuned to each provide the lock signal when a vibration occurring at the computing device, and detected by the at least one accelerometer, exhibits sinusoidal properties.

19. The computer-implemented system of claim 14, wherein the accelerometer signal is digitized and converted to a zero-mean signal by applying a band-pass filter and comparator to the accelerometer signal.

* * * * *